Sept. 25, 1945.  W. A. MOORSHEAD  2,385,529
GLASS MELTING FURNACE
Filed Oct. 9, 1942   2 Sheets-Sheet 1
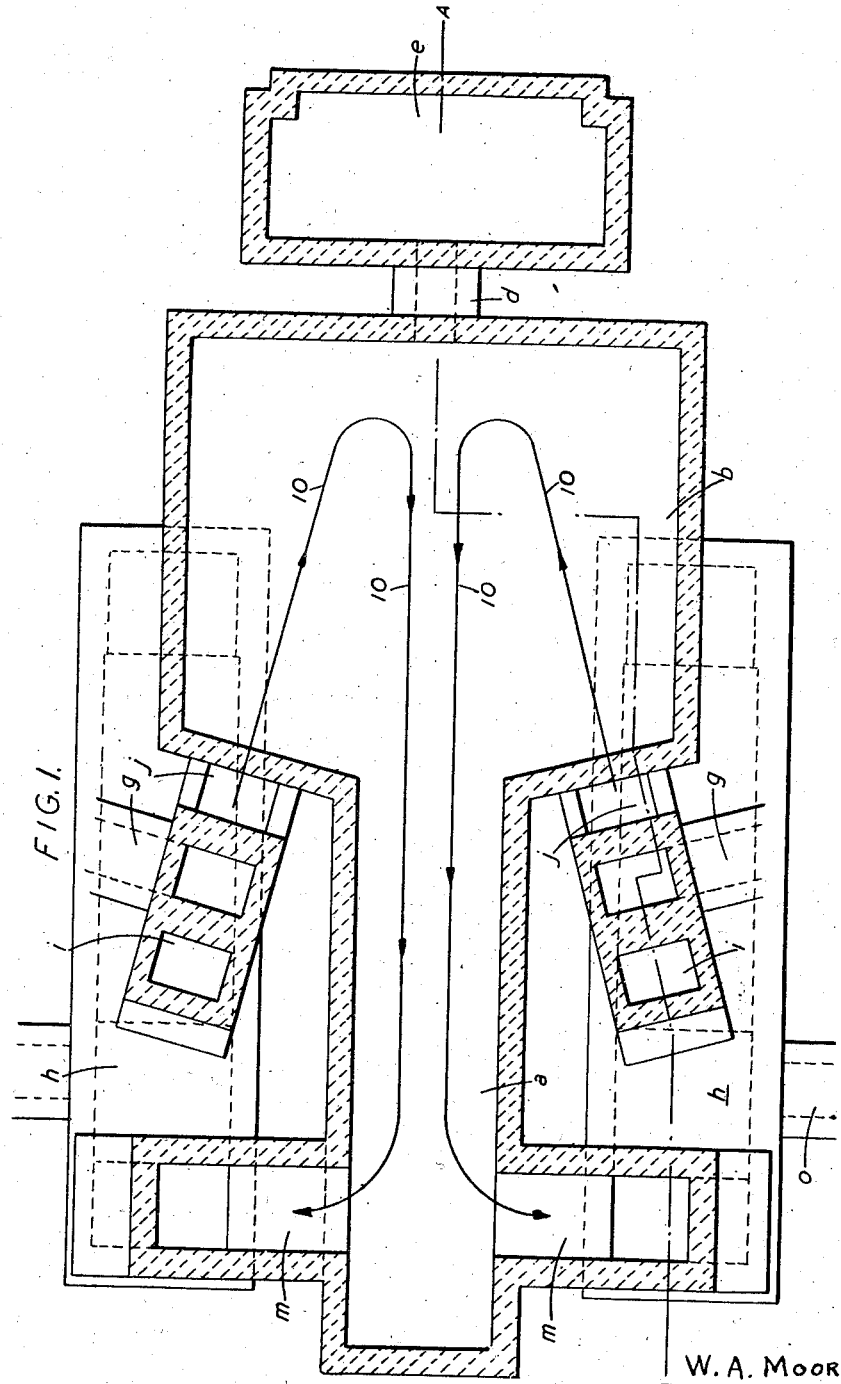
Inventor
W. A. Moorshead
By
Young Emery + Thompson
Attorneys

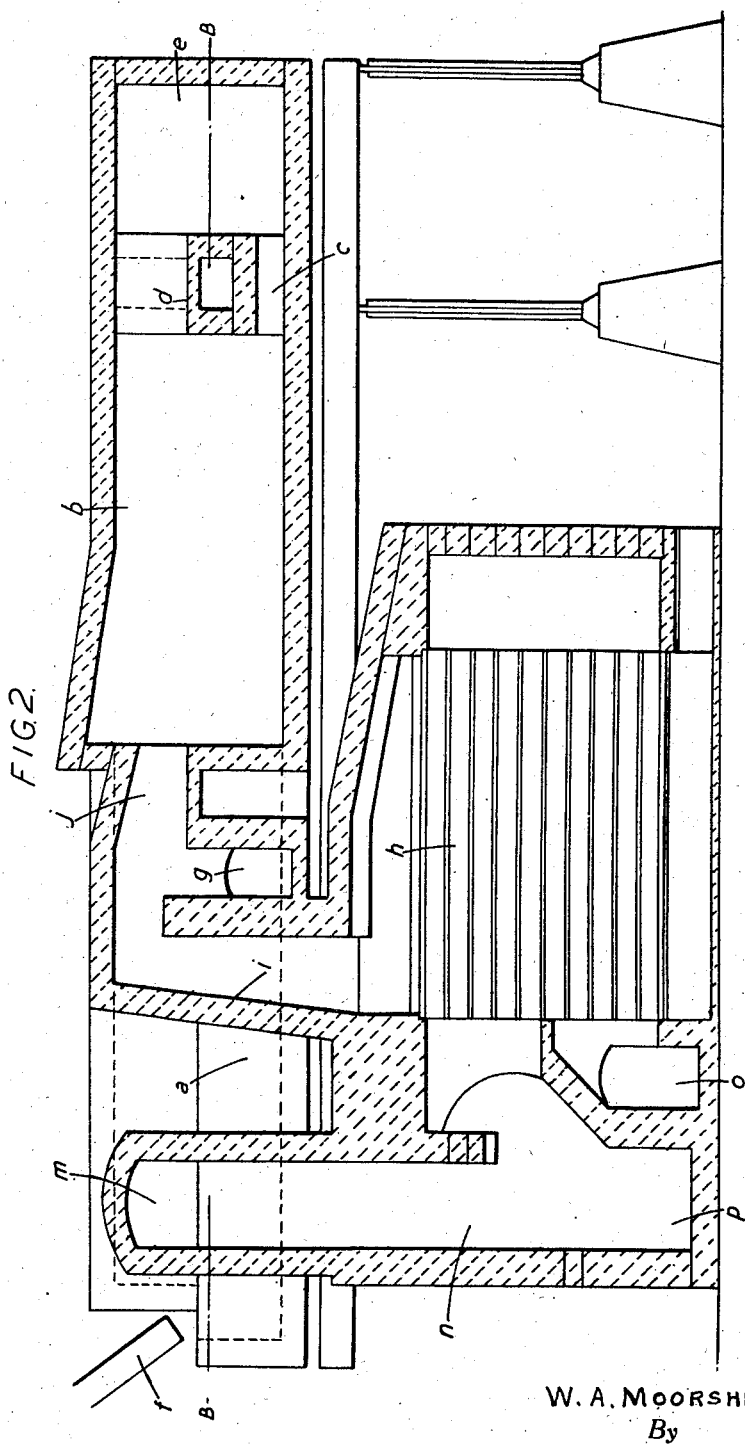

Patented Sept. 25, 1945

2,385,529

UNITED STATES PATENT OFFICE 2,385,529

GLASS MELTING FURNACE

William Alfred Moorshead, London W. C. 2, England, assignor to The United Glass Bottle Manufacturers Limited, a British company Application October 9, 1942, Serial No. 461,437
In Great Britain November 26, 1941

2 Claims. (Cl. 49—54)

This invention relates to glass melting furnaces and has for its chief object the provision of certain improvements therein for the purpose of increasing the fuel efficiency.

Usually, glass melting furnaces are provided with two chambers termed the melting chamber and the conditioning chamber, said chambers being separated by a bridge wall with a communicating passage for the glass, which passage is usually termed a throat. The present invention is concerned primarily with the melting chamber.

In normal practice, the melting chamber is maintained at an elevated and substantially uniform temperature over its whole area and the glass batch is fed by suitable means directly into the hot furnace at one end and is gradually melted down by the heat as it slowly moves to the throat. Generally, the batch has disappeared by the time that the glass has passed about one half of the way to the throat and the remainder of the space or time is utilised in refining the glass, that is to say, in keeping the glass at a high temperature and in a fluid condition to drive out the gas bubbles which are always associated with newly melted glass. The heating is effected by firing oil, coke oven gas, natural gas or producer gas across the furnace at right angles to the direction of flow of the glass, but in some cases, particularly with small furnaces, firing is lengthwise. Also, regenerators are usually employed so that the firing is reversible, the direction of the flame and products of combustion being reversed periodically, for example, about every 20 or 30 minutes.

The efficiency of fuel fired furnaces, is in general a function of the temperature at which the combustion gases leave the furnace and this is directly related to the temperature needed for carrying out the process. Thus, the higher the temperature, the greater is the proportion of heat which must leave the furnace without doing useful work and, since only a proportion of this heat (usually not more than 50%) is recoverable, e. g. in a regenerator or recuperator, it is clear that the higher the temperature of the gases, the greater is the heat lost to the system. For instance, in the usual forms of furnace, the gases leave the melting chamber at a temperature of the order of 1500° C. and the gases at this temperature contain more than 80% of the total heat value of the fuel. Consequently, if the efficiency of the heat recovery system is of the order of 50%, it follows that about 40% of the total heat value is lost irretrievably from the system.

From the foregoing it will be appreciated that if the furnace can be modified so as to cause the temperature of the gases leaving the furnace to be lowered whilst doing useful work in the furnace, an increase in fuel efficiency will result. For example, if the gases instead of leaving at a temperature of about 1500° C., are caused or permitted to leave at a temperature of 1200° C., then the whole of the heat content of the gases between the temperature of 1500° C. and 1200° C. will be utilised in the furnace instead of about one-half thereof being lost.

One of the primary objects of the present invention is to provide an improved form of melting chamber by which the above results may be attained.

According to one feature of the invention, the melting chamber is divided into two sections which may be termed the refining section and the primary heating section. The aforesaid refining section is disposed adjacent the bridge wall and is preferably formed so that it is approximately square in shape and about two-thirds of the total melting area required and so that at its end remote from the bridge wall it merges into the primary heating section which is comparatively long and narrow. Thus, the melting chamber may be said to be approximately T-shaped in plan view. The refining section may have a length of from one-half to two-thirds of that of the melting chamber and the primary heating section may be formed so that its width is of the order of one-third of that of the refining section and so that it is symmetrically disposed in relation to the centre line of the furnace for a length adapted to afford an area substantially equal to the remaining one-third required for the total melting area. Thus, the total area of the furnace will be substantially the same as that usually employed but the section where the raw batch is melted will be of elongated form, that is to say, considerably narrower and longer.

In order that the said invention may be clearly understood and readily carried into effect, the same will now be more fully described with reference to the accompanying drawings, in which:

Figure 1 is a sectional plan view of one form of the furnaces according to the invention taken on the line B—B of Fig. 2; and Fig. 2 is a vertical sectional view taken on the line A—A of Fig. 1.

In the form of the invention shown in the accompanying drawings, $a$ indicates the primary heating section of the furnace and $b$ indicates the refining section thereof. As will be seen, the refining section is approximately square in shape and is in communication, at the right hand end thereof and through a throat c (which is of conventional form) in a bridge wall d, with the working end e which is also of conventional form. The aforesaid refining section is preferably formed so that its area is about two-thirds of the total melting area required and, at its end remote from the bridge wall, it merges into the primary heating section which is comparatively long and narrow so that the melting chamber is approximately T-shaped in plan view. The refining section may have a length of from one-half to two-thirds of that of the melting chamber and the primary heating section may be formed so that its width is of the order of one-third of that of the refining section and so that it is symmetrically disposed in relation to the centre line of the furnace for a length adapted to afford an area substantially equal to the remaining one-third required for the total melting area. Thus, the total area of the furnace will be substantially the same as that usually employed but the section where the raw batch is melted will be of elongated form, that is to say, considerably narrower and longer.

In operation, glass batch is fed in any suitable manner into the left hand end of the primary heating section as, for example, from a hopper (not shown) through a spout f, and gradually flows along the primary heating section to the refining section. Usually, melting will be substantially complete by the time that the glass enters the refining section. In the latter a high temperature is maintained and by reason of the comparatively large area of the said refining section, the process of refining can be successfully completed therein.

As will be seen, gas burners are provided and arranged to fire directly into the refining chamber, said burners being fitted in position in the end wall of the refining section remote from the bridge wall so that there is at least one burner on each side of the primary heating section. Gas is supplied to the burners from a gas producer (not shown) through the flues g and air is supplied from the recuperators h through the flues i so that the gas and the air meet in the ports j, the arrangement being such that the flames issue from such ports directly into the refining section and the flames and resultant waste gases take what may be termed a hair-pin or horseshoe-like path or are caused, after traversing across a part of the refining section, to turn through an angle of almost 180° as indicated by the arrowed lines 10 and, thereafter, to flow through the primary heating section in a direction opposite to that of the movement of the glass.

Thus, it will be seen that the combustion gases at a temperature governed by that required in the refining chamber are utilised in heating up the cold batch materials in the primary heating section, said gases entering the latter after having been cooled down to a temperature approximately to that in the refining section of the furnace. In practice, the gases should be cooled down to a temperature of the order of 1200° C. or proportionately for furnaces working at temperatures different from 1500° C. The gases pass out of the furnace through the exhaust ports m, down a down-take n, into the recuperator h and finally out through the chimney flue o, a slag pocket p being provided at the lower end of the downtake to trap material carried out of the exhaust ports with the waste gases.

From the foregoing, it will be appreciated that the counter-flow principle of heating is utilised and that according to an important feature of the invention there is provided a melting furnace of such a shape that a section is provided, preferably where the glass is in the early stages of melting, where the directions of flow of the melting glass and of the combustion gases are directly opposite to each other and are in both cases restricted to such directions. Further, combustion of the fuel gases takes place in the refining section where the greatest heat is required and in providing this heat the combustion gases are cooled down to a temperature approximating that of the refining section.

The roof over the primary heating chamber is preferably kept as low as possible for the dual purpose of keeping the combustion gases in close contact with the melting glass and also to prevent radiation from the refining section. The total area of the furnace will be substantially the same but because there will be no intensely hot flame in the primary heating chamber, the latter may be heavily insulated so that the total heat loss from the furnace is reduced.

Thus, it will be seen that in accordance with the invention, the melting chamber is divided into two sections and the heat evolved in one section, namely, the refining section is, in part, utilised to heat up the cold batch in the other section with the result that the temperautre of the gases leaving the furnace is reduced whilst doing useful work and the fuel efficiency is increased.

I claim:

1. A glass melting furnace comprising, a melting chamber having a long narrow primary heating section merging into and axially aligned with an approximately square refining section which where it merges into the primary heating section is provided with end walls inclined to the aligned longitudinal axes of the primary heating and refining sections, said inclined end walls being formed with ports for introducing heating gases into, and directing the same towards the central portion of, the refining section, a working end, a bridge wall with a throat therein between said refining section and said working end, and means for withdrawing spent heating gases from said primary heating section, said gas introducing ports and withdrawing means being so located that the gases traverse the refining section and then the primary heating section.

2. A glass melting furnace according to claim 1, in which the refining section has a length of from one-half to two-thirds of that of the melting chamber and the primary heating section is formed so that its width is of the order of one-third of that of the refining section and so that it is symmetrically disposed in relation to the center line of the furnace.

WILLIAM ALFRED MOORSHEAD.